Nov. 4, 1924. 1,514,148
N. R. FORSSBLAD
CURRENT SUPPLY SYSTEM FOR MOBILE ELECTRICAL MACHINES
Filed Oct. 23, 1922
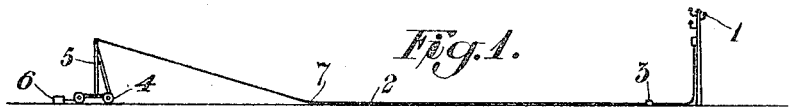
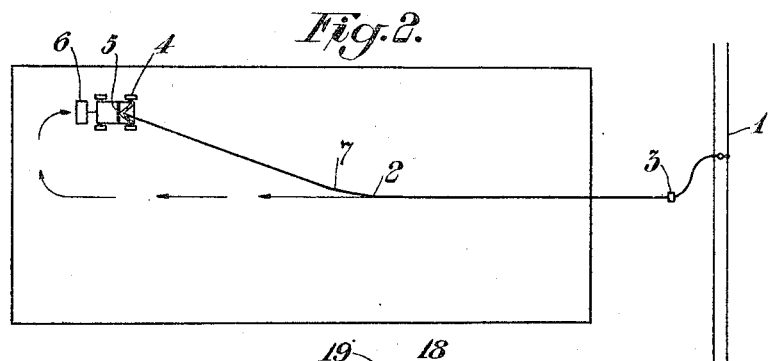
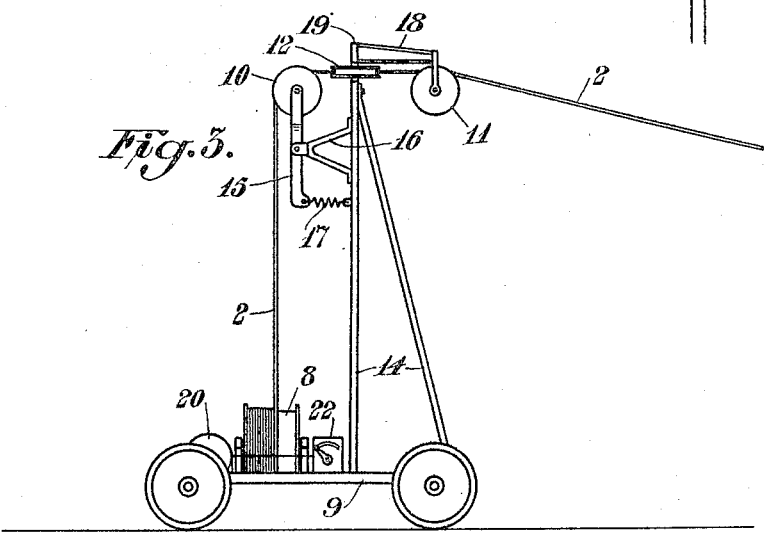
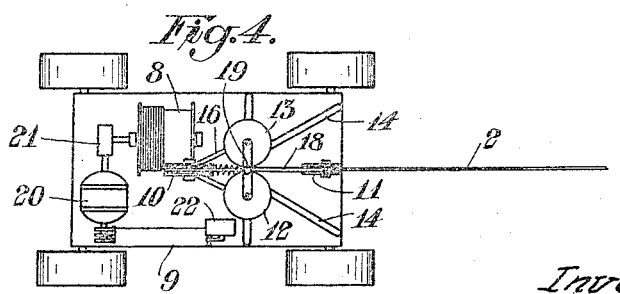
Inventor:
N. R. Forssblad
By Marks & Clerk
Atty's Patented Nov. 4, 1924.

1,514,148

UNITED STATES PATENT OFFICE.

NILS RICHARD FORSSBLAD, OF VASTERAS, SWEDEN.

CURRENT-SUPPLY SYSTEM FOR MOBILE ELECTRICAL MACHINES.

Application filed October 23, 1922. Serial No. 596,521.

*To all whom it may concern:*

Be it known that NILS RICHARD FORSSBLAD, a subject of the King of Sweden, residing at Vasteras, Sweden, has invented certain new and useful Improvements in Current-Supply Systems for Mobile Electrical Machines, of which the following is a specification.

The invention relates to electrically driven vehicles, particularly agricultural tractors, of the kind which are supplied with current through an insulated cable arranged to be wound on and off a drum mounted on the carriage, the cable being laid out on the ground, when the tractor is moving in an outgoing direction from a current supply point or from the point where the cable is anchored on the ground, whilst the cable is again hauled in and wound on to the drum, when the tractor is returning in the opposite direction. Systems of this kind heretofore known are open to many disadvantages, which may be referred to the inconvenient method of managing the cable during the movement of the tractor. The practical difficulties particularly occur, when the tractor is going to return over the field while hauling in the cable. In some systems the cable will then form a bight, which is dragged after the tractor and which, therefore, may easily place itself around some obstacle on the ground thereby hampering the movement of the tractor and increasing the resistance which has to be overcome in winding up the cable. In addition thereto the cable is exposed to a considerable wear when being dragged on the ground in this way. Said disadvantages are particularly apparent in systems in which the winding on and off of the cable is effected automatically.

In order to overcome said disadvantages it has been proposed to lead off the cable by means of a jib arm mounted on the tractor and to lay out the cable at one side of the tractor, preferably midway between the outgoing and return paths, the end of the jib arm being then carrier along the cable on the return way so as to cause the cable to be hauled in vertically from the ground. This arrangement, however, will limit the free movement of the tractor considerably, as the length of the jib arm will determine the distance between the outgoing and return paths.

It has also been suggested to arrange the current supply cable freely depending between the tractor and the fixed point, but this arrangement again will increase the pull of the cable considerably and will therefore require special arrangements, whereby the system is made expensive and complicated.

According to the present invention the cable is led off at a great height above the tractor from the top of a mast or tower and laid out on the ground behind the tractor when moving in an outgoing direction, whereas, upon returning in the opposite direction, the cable is hauled in in front of the tractor while being stretched diagonally across the field so as to cause the cable to leave the ground at a point ahead of the tractor. In this arrangement there will, apparently, be no dragging of the cable behind the tractor but the cable will be successively lifted from the ground out of the position in which it has been laid out. Further, the return path may be put further away from the outgoing path.

The invention also involves certain improved arrangements for guiding the cable and for automatically keeping the cable stretched, which will be described with reference to the drawing. In the drawing Figs. 1 and 2 illustrate schematically, in elevation and in plan view respectively, the method of managing the cable. Fig. 3 is a side view and Fig. 4 a plan view of the tractor.

In Figs. 1 and 2 the numeral 1 designates the supply main, 2 the insulated cable and 3 an anchorage whereby the cable is secured to the ground. The tractor is designated by 4, and 5 is a mast or tower structure at the top of which the cable is led off. 6 designates the agricultural implement, f. i., a plough, driven by the tractor. The arrows indicate the way traversed by the tractor. When the tractor is moving in an outgoing direction, the cable is laid out behind the tractor in its line of movement. In the position shown in the drawing the tractor is returning to the starting side of the field, while the cable is being hauled in in front of the tractor and wound on the cable drum mounted on the tractor. The winding on and off of the cable is effected automatically by means of an electrical motor adapted to exert a suitable pull on the cable. The tension of the cable thereby produced should be sufficient to cause the cable to be freely hanging in the air for a distance, counted from the tractor, which is larger than the distance between the outgoing and return paths, so that the cable, when being hauled in, will be stretched diagonally across the field, as shown in Fig. 2. The cable will thus be lifted successively from the ground at a point 7, that is always ahead of the tractor, without being dragged on the ground. According as the ploughing proceeds the anchorage 3 may be displaced along the side of the field.

As shown in Figs. 3 and 4 the cable is carried on to the drum 8 mounted on the frame 9 of the tractor, by means of a number of guide pulleys 10, 11, 12, 13 provided on the top of a mast structure 14. The pulley 10 is mounted on a horizontal shaft at the upper end of a lever 15 pivoted to a bracket 16 and actuated by a buffer spring 17. The pulley 11 is likewise pivoted horizontally and mounted on an arm 18 pivoted on a vertical pin 19. Below said pin there are provided two guide pulleys 12, 13 with vertical axes arranged one on each side of the cable 2.

The object of this arrangement is to prevent the cable from being twisted when the tractor is turned. In turning the tractor, f. i., 180° from the position shown in Figs. 3 and 4 the cable will be wound around one of the pulleys 12, 13 the pulley 11 then following the movement of the cable. The next turning of the tractor must, evidently, be made to the other side and can be carried out for an angle of 360°. One of the pulleys 12, 13 may be dispensed with, if the cable is allowed to be wound several turns on one pulley, or in case the manageability of the tractor may be restricted. Instead of the pulleys 12, 13 one or two vertical cylindrical rollers may be similarly arranged.

The drum 8 is driven by an electrical motor 20 coupled to the shaft of the drum by means of a gearing 21. Said motor is adapted to produce a torque sufficient to cause the cable to be wound on and off automatically according as the tractor is being displaced on the field. The motor is further designed so as to be capable of maintaining the cable stretched while standing still under tension. Preferably, suitable resistances are included in the circuit of the armature winding of the motor, which resistances may be varied by means of a starter 22, for the purpose of varying the torque of the motor. As an example a three-phase induction motor may be used having adjustable inductive resistances included in the rotor circuit.

It should be observed that, principally, the invention is not limited to the described arrangement for keeping the cable stretched as other automatic systems may be devised serving the same purpose.

I claim:

1. In a current supply system for agricultural tractors the combination of a cable drum mounted on the carriage of the machine, an insulated current supply cable, anchored at one end on the ground and arranged to be wound on and off said drum, a mast structure on said carriage, a guiding device for leading off the cable provided at the top of said mast structure and means for stretching the cable automatically during the movement of the tractor so as to keep the cable depending over the tractor and the agricultural implement attached thereto in every position of the tractor in relation to the cable.

2. In a system as claimed in claim 1, a guiding device for the cable comprising a number of guide pulleys with vertical axes arranged so as to allow the cable to be wound on and off one of them, when changing the direction of movement of the carriage.

3. In a system as claimed in claim 1, a guiding device for the cable comprising two guide pulleys with vertical axes arranged one on each side of a horizontal part of the cable, and a leading off pulley with horizontal axis mounted at the end of an arm swingable about a vertical axis.

4. In mobile electrical machines the combination of a current supply cable arranged to be wound on a drum mounted on the carriage of the machine, and a guiding device for leading off the cable comprising a number of guide pulleys with horizontal axes and a number of guide pulleys with vertical axes, the latter being arranged so as to allow the cable to be wound on and off one of them, when changing the direction of movement of the machine.

5. In mobile electrical machines the combination of a current supply cable arranged to be wound on a drum mounted on the carriage of the machine, and a guiding device for leading off the cable comprising a number of guide pulleys with vertical axes and a leading off pulley with horizontal axis mounted at the end of an arm swingable about a vertical axis.

6. A combination as claimed in claim 5, in which the arm carrying the leading off pulley is swingable within an angle of 180° so as to allow the carriage to be turned round while laying out the cable behind the carriage and hauling in the cable in front of the carriage.

7. In mobile electrical machines the combination of a current supply cable arranged to be wound on a drum mounted on the carriage of the machine, and a guiding device for leading off the cable comprising two pulleys with vertical axes arranged one on each side of the cable, and a leading off pulley with a horizontal axis mounted at the end of an arm swingable about a vertical axis.

8. In mobile electrical machines the combination of a current supply cable arranged to be wound on a drum mounted on the carriage of the machine, and a guiding device for leading off the cable comprising two guide pulleys with horizontal axes and two pulleys with vertical axes arranged one on each side of the cable between the guide pulleys first mentioned one of said pulleys with horizontal axes being mounted at the end of an arm swingable about a vertical axis.

9. In mobile electrical machines the combination of a current supply cable arranged to be wound on a drum mounted on the carriage of the machine, a mast structure on the carriage, two guide pulleys with vertical axes provided at the top of said structure, a guide pulley with horizontal axis arranged between the drum and said pulleys with vertical axis, a buffer spring actuating said pulley with horizontal axis, so as to allow the pulley to yield to abnormal pressures of the cable, and a leading off pulley with horizontal axis mounted on an arm swingable about a vertical axis.

In testimony whereof I affix my signature in presence of two witnesses.

NILS RICHARD FORSSBLAD.

Witnesses:
OSCAR GRAHN,
HILDEN EKLUND.